(12) United States Patent
Singh et al.

(10) Patent No.: US 9,217,112 B2
(45) Date of Patent: Dec. 22, 2015

(54) SYSTEMS AND METHODS FOR CONVERTING GASES TO LIQUIDS

(71) Applicant: General Electric Company, Schenectady, NY (US)

(72) Inventors: Surinder Prabhjot Singh, Niskayuna, NY (US); John Brian McDermott, Rexford, NY (US); Lingzhi Zhang, Lansdale, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/794,918

(22) Filed: Jul. 9, 2015

(65) Prior Publication Data

US 2015/0315482 A1  Nov. 5, 2015

Related U.S. Application Data

(62) Division of application No. 13/435,852, filed on Mar. 30, 2012, now Pat. No. 9,096,803.

(51) Int. Cl.
*B01J 8/00* (2006.01)
*B01J 8/04* (2006.01)
*C10G 2/00* (2006.01)
*C01B 3/36* (2006.01)
*B01J 19/24* (2006.01)

(52) U.S. Cl.
CPC .............. *C10G 2/34* (2013.01); *B01J 19/245* (2013.01); *C01B 3/36* (2013.01); *B01J 2219/00103* (2013.01); *B01J 2219/24* (2013.01); *C01B 2203/0261* (2013.01); *C01B 2203/062* (2013.01); *C01B 2203/1241* (2013.01)

(58) Field of Classification Search
CPC .................. B01J 2219/00103; B01J 2219/24; B01J 19/245; C10G 2/34; C01B 3/36; C01B 2203/0261; C01B 2203/062
USPC ......................................... 422/622, 648, 234
See application file for complete search history.

(56) References Cited

U.S. PATENT DOCUMENTS

| 4,978,689 A | 12/1990 | Bell et al. |
| 5,856,585 A | 1/1999 | Sanfilippo et al. |
| 6,130,259 A | 10/2000 | Waycuilis |
| 6,455,597 B2 | 9/2002 | Hohn et al. |
| 6,593,377 B1 | 7/2003 | Harford et al. |
| 6,903,139 B2 | 6/2005 | Landis et al. |
| 6,946,493 B2 | 9/2005 | Mohedas et al. |

(Continued)

OTHER PUBLICATIONS

Fox et al.,"The Slurry Phase Fischer-Tropsch Reactor", U.S.Department of Energy, Pittsburgh Energy Technology Center, Bechtel Group, Inc. Nov. 8, 1990, pp. 317-342.

(Continued)

*Primary Examiner* — Jafar Parsa
(74) *Attorney, Agent, or Firm* — Francis T. Coppa

(57) ABSTRACT

A system and method of converting natural gases to liquids is provided. The system includes a catalytic partial oxidation (CPO) system with natural gas, air and steam input, a Fischer-Tropsch (F-T) system taking syngas from the CPO system, and supplying product gases to a power engine (PE), after separation of the product liquids. An F-T steam output line is in fluid communication with the CPO-steam input line. The energy output from the PE is supplied to the compressors and condensers, to provide self-sustainability in energy, for the gas-to-liquid separation system.

8 Claims, 2 Drawing Sheets

(56) References Cited

U.S. PATENT DOCUMENTS

Figure 1:
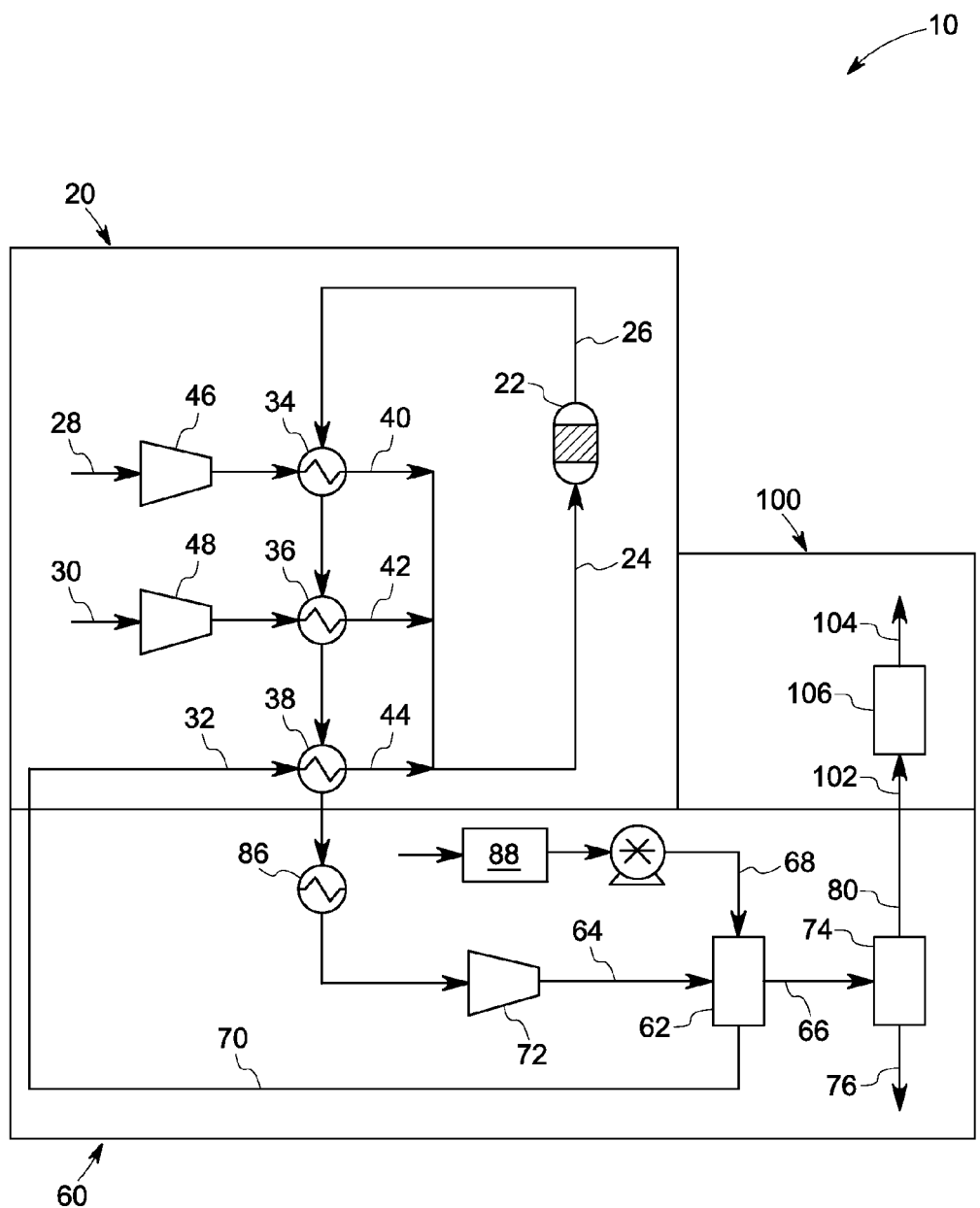

| | | |
|---|---|---|
| 7,108,838 B2 | 9/2006 | McGee |
| 2003/0083391 A1 | 5/2003 | Jahnke et al. |
| 2008/0093583 A1 | 4/2008 | van den Oosterkamp et al. |

OTHER PUBLICATIONS

Enrique Iglesia.,"Design, synthesis, and use of cobalt-based Fischer-Tropsch synthesis catalysts", Elsevier, Applied Catalysis A: General 161,(1997), pp. 59-78.

"Synthetic Gas Production Technology by Catalytic Partial Oxidation of Natural Gas", Petroleum Energy Center, 1999 Survey 7, Downloaded from the Internet:<http://www.pecj.or.jp/japanese/report/reserch/report-pdf/H11_1999/99surv7-e.pdf>, on Mar 30, 2012, 7 Pages.

Hans Schulz.,"Short history and present trends of Fischer—Tropsch synthesis", Elsevier, Applied Catalysis A: General 186 (1999), pp. 3-12.

Mark E. Dry.,"The Fischer—Tropsch process: 1950-2000", Elsevier, Catalysis Today 71 (2002), pp. 227-241.

Tungkamani et al.,"The investigation of Ru based Fischer Tropsch catalyst for the production of synthetic liquid fuels derived from bio-syngas", Ruthenium based Fischer Tropsch catalyst, Proceedings of European Congress of Chemical Engineering (ECCE-6), Copenhagen, Sep. 16-20, 2007, 7 Pages.

"Technical experts' report on the Velocys technology Prepared by Nexant, Inc."; Oxford Catalysts Group PLC; Oct. 31, 2008; 39 Pages.

Derek Atkinson, "Problem Gas Solutions", Regional Forum, Muscat 10-11,Oxford Catalysts, May 2010, 26 Pages.

Tonkovich et al., "Microchannel Gas-to-Liquids for Monetizing Associated and Stranded Gas Reserves", Oxford Catalyst Group, 2011, 7 Pages.

"Gas to liquids", Gas to liquids technology worldwide, Chemlink Pty Ltd, Downloaded from the Internet<http://www.chemlink.com.au/gtl.htm#_ftnret7>on Feb. 21, 2012; 10 Pages.

"Low Temperature-Catalytic Partial Oxidation (LT-CPO) and Gas to Liquids (GTL) Conversion", Catalytic Process Engineering, Catalytic Process Engineering Group, Downloaded from the Internet:<http://cpe.web.psi.ch/projekte3.html?> on Feb. 21, 2012, 3 Pages.

Schubert et al.,"Fischer-Tropsch Diesel Fuel Preparation and Testing",Syntroleum Corporation, Downloaded from the Internet:<http://www.anl.gov/PCS/acsfuel/preprint%20archive/Files/45_3_WASHINGTON%20DC_08-00_0592.pdf>, on Mar. 30, 2012, pp. 592-597.

"Maximising plant reliability and operability", CompactGTL Technical Overview, Downloaded from the Internet:<http://compactgtl.com/process/technical-overview/>, on Mar. 30, 2012, 6 pages.

Rabe et al., "Catalytic Partial Oxidation (CPO) of Methane to Synthesis Gas over Noble Metal Catalysts", Paul Scherrer Institut, PSI, Allgemeine Energie, Laboratory for Energy and Materials Cycles, Downloaded from the Internet: <http://www.psi.ch/cpe/PosterCPEEN/Heidelberg_poster_4.pdf> on Sep. 16, 2015, poster session, Heidelberg, Germany, Jun. 5-8, 2005,1 Page.

SYSTEMS AND METHODS FOR CONVERTING GASES TO LIQUIDS

CROSS REFERENCE TO RELATED APPLICATIONS

This application is a divisional of U.S. patent application Ser. No. 13/435,852, titled "SYSTEMS AND METHODS FOR CONVERTING GASES TO LIQUIDS," filed on 30 Mar. 2012.

BACKGROUND

The invention relates generally to systems and methods for converting gases to liquids. More particularly, the invention relates to converting natural gases to liquids using catalytic partial oxidation.

Natural gas or other gaseous hydrocarbons are normally converted into a liquid form, such as longer-chain hydrocarbons, using a large scale gas-to-liquid process. Methane-rich gases are converted into liquid fuels using syngas as an intermediate, as in a Fischer Tropsch (F-T) process.

An F-T process is a set of chemical reactions that convert a mixture of hydrogen ($H_2$) and carbon monoxide (CO) into liquid hydrocarbons. The mixture of $H_2$ and CO may be obtained by subjecting natural gas to partial oxidation. Catalytic partial oxidation (CPO) is one of such partial oxidation processes that oxidize the natural gas in the presence of oxygen, over a catalyst. Treatment of natural gas in a CPO process normally yields $H_2$, CO, carbon dioxide ($CO_2$), and water. The $H_2$ and CO can be used in the subsequent F-T process.

In the CPO process, a pure oxygen input is typically used to obtain a cleaner (without nitrogen dilution) output, so as to obtain higher carbon conversion efficiency from CO to hydrocarbons in an F-T reaction. However, producing oxygen by separating oxygen from air typically requires an air separation unit (ASU), which further requires an input of energy. The additional energy requirement for producing oxygen for the CPO process, and the significant capital investment for producing a mixture of $H_2$ and CO (a mixture commonly referred to as syngas) for the F-T process increases the cost of producing liquids from the gases.

As noted above, the syngas is chemically reacted in the F-T reaction over a catalyst to produce liquid hydrocarbons and other byproducts. However, the $H_2$-to-CO ratio obtained from a typical CPO process may not be the optimal ratio for carrying out the F-T reaction. Normally, the $H_2$-to-CO ratio obtained from a partial oxidation reaction may be lower than what is required for the F-T reaction. The ratio of $H_2$-to-CO may be adjusted before entering the F-T system, by using a water gas shift reaction or alternatively, carrying out steam methane reforming (SMR), instead of CPO. The water gas shift reaction involves reaction of water with CO to produce $H_2$ and $CO_2$, hence increasing the $H_2$-to-CO ratio. The excess carbon dioxide may be removed before the gases enter the F-T system.

The SMR reaction is an alternative method to produce syngas with a higher $H_2$-to-CO ratio (syngas ratio). In this process, methane is reacted with water to produce $H_2$ and CO, with a syngas ratio of about 3.0. This ratio is higher than is required by the F-T reaction. Further, the SMR reaction is an endothermic reaction. Therefore, a portion of the natural gas is usually combusted, to provide energy for the SMR reaction. Since a portion of the feed is combusted instead of being used to generate $H_2$ and CO, the overall conversion efficiency of the SMR reaction is undesirably reduced. In general, the requirement for external heating, and the higher syngas ratio, are two primary drawbacks in using SMR for gas-to-liquid conversion.

Formation of liquid hydrocarbons such as alkanes in the F-T process is desirable. However, methane formation from the F-T reaction is generally not desirable. The F-T process is generally operated in the temperature range of about 190° C.-350° C. Higher temperatures lead to faster reactions and higher conversion rates. However, the higher temperatures also favor methane production.

Another method of increasing F-T reaction rates and conversion is by increasing the pressure within the F-T system. A typical method for increasing the pressure within an F-T system includes compressing the syngas before entering the F-T system. However, pressurizing the syngas before entering the F-T system requires more energy input to the overall system, thereby increasing the cost of gas-to-liquid conversion.

Therefore, there is a need to reduce the energy input to the overall process of converting gases to liquids. A process that requires no energy input (or a greatly-reduced energy input) for the ASU, for syngas producing reaction, and/or for syngas compression, may decrease the overall cost of producing hydrocarbon liquids from natural gas. Furthermore, eliminating the step of balancing the $H_2$-to-CO ratio may benefit the overall process.

BRIEF DESCRIPTION

Briefly, in one embodiment, a system is provided. The system includes a catalytic partial oxidation (CPO) system, a Fischer-Tropsch (F-T) system, and a power engine (PE) system. The CPO system itself usually includes a CPO-input line and a CPO-output line. The CPO-input line is in fluid communication with a CPO-natural gas input line, a CPO-air input line, and a CPO-steam input line. The F-T system usually includes an F-T-reactor input line, an F-T-reactor output line, an F-T water input line, and an F-T steam output line. The F-T-reactor input line is usually in fluid communication with the CPO-output line and an F-T-syngas compressor. The F-T-reactor output line is usually in fluid communication with an F-T-liquid output line, and an F-T-gas output line. The F-T steam output line is in fluid communication with the CPO-steam input line. The PE system includes a PE, a PE input line, and a PE-output line. The PE-input line is in fluid communication with the F-T-gas output line, and the PE is configured to provide energy to the F-T-syngas compressor.

In one embodiment, a method is provided. The method includes the steps of feeding natural gas, air, and steam to a CPO system as a CPO input, starting the CPO initial reaction by providing external heat to the CPO system, carrying out a CPO reaction to produce a CPO output comprising syngas and nitrogen, feeding at least a part of the CPO output as a Fischer-Tropsch (F-T) reactor input to an F-T system; feeding water as an input to the F-T system; carrying out an F-T reaction in the F-T system to produce an F-T steam output, and an F-T reactor output comprising F-T liquids, and F-T gases; feeding the F-T gases as an input to a power engine (PE); and supplying at least a portion of the F-T steam as a feed to the CPO system.

DRAWINGS

Figure 2:
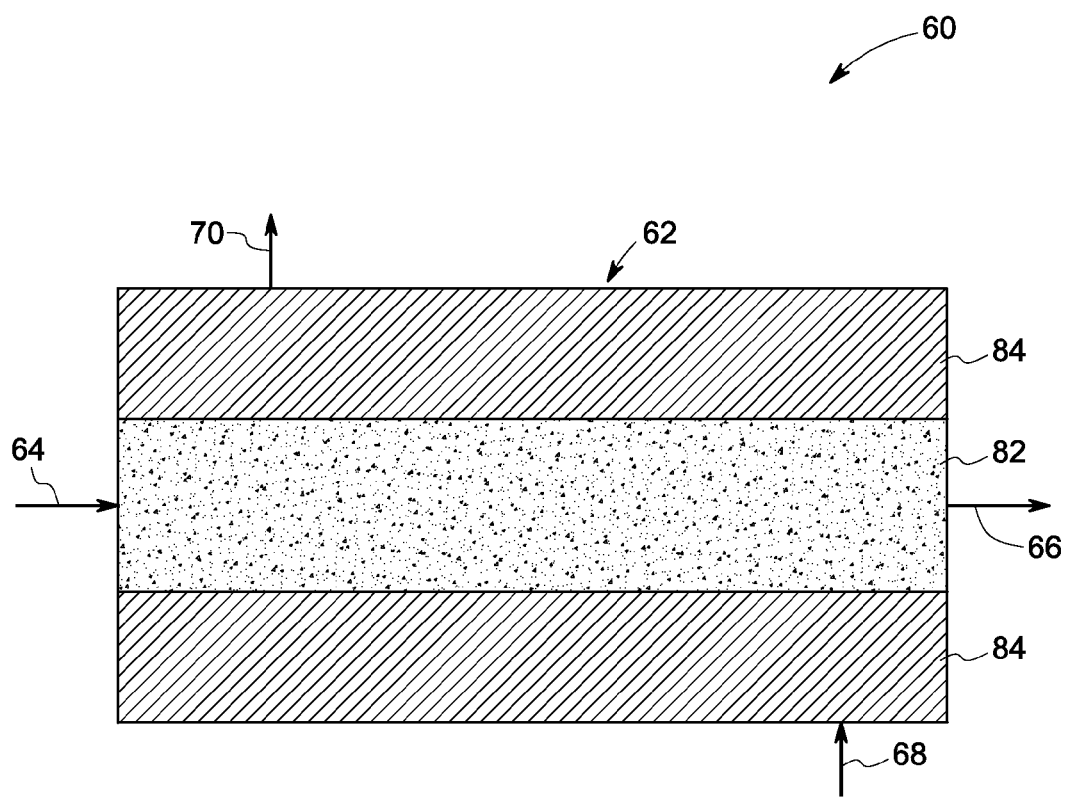

These and other features, aspects, and advantages of the present invention will become better understood when the following detailed description is read with reference to the accompanying drawings, in which like characters represent like parts throughout the drawings, wherein:

FIG. 1 illustrates a system for converting gases to liquids, according to an embodiment of the invention; and FIG. 2 illustrates a Fischer-Tropsch (F-T) reactor, according to an embodiment of the invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill, having the benefit of this disclosure.

In the following specification and the claims, the singular forms "a", "an" and "the" include plural referents, unless the context dictates otherwise.

Embodiments of the present invention provide a system and method for conversion of gases to liquids. Particularly the system converts natural gases to hydrocarbon liquids. The process of conversion as per the embodiments of this invention includes syngas (a mixture of $H_2$ and CO) production from a catalytic partial oxidation (CPO) reaction, and processing the syngas in a Fisher Tropsch (F-T) system to produce hydrocarbon liquids. Further, the F-T system converts water to steam, using the F-T reaction heat. The steam may be fed to the CPO system. The hydrocarbon liquids may be separated from the F-T system products, and the gases of the F-T system product may be fed into a power engine (PE), to produce energy.

FIG. 1 schematically represents a system as per one embodiment of the present invention. In FIG. 1, the system 10 for converting gases to liquids includes (as indicated by the "boxed lines") a CPO system 20, an F-T system 60, and a power engine (PE) 100. The CPO system 20 includes a CPO reactor 22, a CPO-input line 24 and a CPO-output line 26. The CPO-input line is in fluid communication with (as that term is defined below) a CPO-natural gas input line 28, a CPO-air input line 30, and a CPO-steam input line 32.

The F-T system 60 includes an F-T reactor 62, an F-T-reactor input line 64, an F-T-reactor output line 66, an F-T water input line 68, and an F-T steam output line 70. The F-T-reactor input line 64 is in fluid communication with an F-T-syngas compressor 72. The CPO-output line 26 of the CPO system 20 is in fluid communication with the F-T-syngas compressor 72 and the F-T-reactor input line 64. The F-T-reactor output line 66 is in fluid communication with an F-T product separator 74, F-T-liquid output line 76, and an F-T-gas output line 80. The F-T steam output line 70 is in fluid communication with the CPO-steam input line 32.

The PE (power engine) system 100 includes a PE 106, a PE input line 102, and a PE-output line 104. The PE-input line 102 is in fluid communication with the F-T-gas output line 80. The PE 106 is in communication with the F-T-syngas compressor 72, e.g., by an energy supply conduit (not specifically depicted in the drawings) that provides energy to the F-T-syngas compressor 72, to compress the syngas.

FIG. 2 schematically represents the operation of an F-T system. The F-T reactor 62 of F-T system 60 (FIG. 1) includes an inner, reaction region 82, and an outer region 84. The F-T reactor input line 64 and the F-T reactor output line 66 are in fluid communication with the inner region 82 of the F-T reactor 62. The F-T water input line 68 and the F-T steam output line 70 are in fluid communication with the outer region 84 of the F-T reactor. As noted earlier, the F-T system 60 is a schematic representation, and may include multiple channels in the reactor region 82 and/or the outer region 84.

In one embodiment of the invention, the CPO system 20 (FIG. 1) further includes three heat exchangers. 34, 36, and 38. The heat exchanger 34, for example, can be in communication with the CPO-natural gas input line 28, and the CPO-output line 26. The heat exchanger 36 is in communication with the CPO-air input line 30, and the CPO-output line 26. The heat exchanger 38 is in communication with the CPO-steam input line 32, and the CPO-output line 26. The heat exchangers 34, 36, and 38 may exchange their places, depending on the design of the CPO system 20. In some embodiments, The CPO system 20 may further include a natural gas compressor 46, and an air compressor 48. The F-T system 60 may further include a syngas condenser 86, and a water purifier 88. The natural gas compressor 46 may deliver compressed natural gas to the CPO reactor 22, to further enhance efficiency of the CPO reactor. Similarly, the air compressor 48 may compress air and deliver the compressed air as an input to the CPO reactor 22. The syngas condenser 86 may condense the moisture from the CPO-output, and supply at least a part of the syngas to the F-T reactor 62. The natural gas compressor 46, and air compressor 48 may further be in communication with the PE 106 (not shown in figures).

As used herein, the term "in fluid communication with" implies that different systems or system units are connected to each other with some fluid input or fluid output. This communication may be direct or indirect, i.e., passing through some intervening units or sections. For example, in one embodiment, as shown in FIG. 1, the F-T steam output line 70 is in fluid communication with the CPO-steam input line 32 directly without having any intervening units, while the CPO-output line 26 is in fluid communication with the F-T reactor input line 64 through the intervening units such as F-T syngas compressor 72, and the syngas condenser 86. The "CPO-output line 26 is in fluid communication with the F-T reactor input line 64" means that the F-T reactor input line 64 receives the syngas from the CPO-output line 26.

As used herein, the term "in communication with" implies that different systems or system units are connected to each other with some input or output. This communication may be direct or indirect, i.e., passing through some intervening units or sections. Further, the "input" and "output" as used herein includes the passage of any fluids, heat, or energy. For example, the "PE 106 is in communication with the F-T-syngas compressor 72" implies that the PE 106 supplies energy for the compression of syngas in the syngas compressor 72. Similarly, as shown in FIG. 2, the F-T reactor inner region 82 and the F-T reactor outer region 84 may be in communication with each other through heat transfer.

In one embodiment, a method of converting natural gases to liquids using the system 10 is provided. The method includes providing the natural gas, along with air and steam, to the CPO reactor 22.

The air as used herein may be natural air, or an oxygen-enriched air. In one embodiment, the percentage of oxygen in the air is less than about 25 volume %. In one embodiment, the percentage of oxygen in the air is in the range from about 18 volume % to about 22 volume %. In some embodiments, a ratio of oxygen to carbon in a combined input of air and natural gas may be controlled to be in a range from about 0.5 to about 1.5. In one embodiment, the ratio of oxygen to carbon is in a range from about 1 to about 1.4. In some embodiments, this range of about 1 to about 1.4 is preferred, because it appears to provide enhanced efficiency.

The use of air in systems like those described herein is in surprising contrast with conventional systems that include CPO reactors, e.g., for converting gases to liquids. In the conventional systems, usage of air was often thought to be undesirable. One reason relates to the presence of the other components in air, such as nitrogen, that dilute the desired syngas resulting from the CPO reaction. However, in embodiments of the present invention, the use of air is acceptable, and in some instances may be a very desirable attribute, as described herein.

The diluted syngas can be converted to a mixture of light and heavy hydrocarbons mixed with nitrogen. The liquids can be separated, leaving the light hydrocarbons and nitrogen in the gas phase. As shown in FIG. 1, for example, the gases from the F-T gas output line 80 may be used as an input to the PE system 100, to produce energy. In one embodiment, as shown in FIG. 1, the separation of the byproduct (i.e., light hydrocarbons and nitrogen) gases from liquids is carried out after the F-T process is substantially complete, in the separator 74. The separator 74 is an apparatus configured to cool down the product that exits the F-T reactor. The reduced temperature causes the heavier hydrocarbons to condense and separate out, leaving the nitrogen and light hydrocarbons, such as methane, in the gas phase. These gases from the separator may be fed to the PE system 100 as an input.

As described above, syngas produced from some of the conventional CPO-based processes is characterized by a lower syngas ratio than required for the F-T process. In one embodiment of the present invention, the syngas ratio ($H_2$-to-CO ratio) for the CPO reactor 22 should be about 2, e.g., in those situations in which the F-T system 60 employs a cobalt-catalyst. As used herein, a ratio of "about 2" refers to a value greater than 1.95 and less than 2.25. Different techniques may be used to adjust the syngas ratio to a desired value. Usually, the syngas ratio may be controlled by controlling two main parameters, such as the oxygen-to-carbon ratio, and the steam-to-carbon ratio. Depending on the desired syngas ratio for the F-T reactor, the amount of air (which includes oxygen), steam, and natural gas may be controlled relative to each other, to achieve the desired oxygen-to-carbon ratio and steam-to-carbon ratios. For example, and with reference to FIG. 1, the syngas ratio of the CPO reactor 22 may be adjusted by directing steam to the CPO reactor 22, through the CPO-steam input line 32. The steam can serve as an additional source of hydrogen to adjust the syngas ratio. In one embodiment, the CPO input has a steam-to-carbon ratio (in the CPO-input line 24) in a range from about 0.3 to about 1.5. In a further embodiment, the steam-to-carbon ratio in the CPO-input line 24 is in a range from about 0.5 to about 1. (In some preferred embodiments, the desired ratio of hydrogen to carbon monoxide in the syngas is in the range of about 1 to about 3).

In one embodiment, at least a portion of the gaseous output of the CPO reactor 22 is supplied to the F-T system 60. System 60 provides the reaction of the gases over the catalyst, to covert the syngas into hydrocarbon liquids. The F-T system may use different catalysts, such as those based on cobalt, iron, or ruthenium. In one embodiment, the catalyst used by the F-T system is a cobalt catalyst. The catalytic reaction occurring in the F-T reactor inner region 82 (FIG. 2) is exothermic, and hence gives off heat. Water, which may be purified in a purifier 88 (FIG. 1, and depicted simply with the arrow aimed into 88), is supplied to the outer region 84 of the F-T reactor 62 (FIG. 2). The heat output of the F-T process in the inner region 82 heats up the water in the outer region 84, and converts the water into steam. In one embodiment, the steam output from the F-T system 60 is passed as the steam input to the CPO reactor 22. In one embodiment, the steam exiting the F-T reactor 62 is at a temperature in a range from about 100° C. to about 350° C.

It is usually desirable to heat the input constituents to the CPO reactor 22 beforehand, in order to increase the overall efficiency of the system. However, the CPO reaction itself is exothermic and hence, liberates heat. The liberated heat is carried by the CPO output, passing through the CPO-output line to the F-T input line 64. In one embodiment, the F-T reactor requires a syngas input at a temperature lower than the CPO-output. Therefore, in one embodiment, the CPO system 20 includes one or more heat exchangers 34, 36, and 38 (described briefly above), configured to take out heat from the CPO output. For example, as shown in FIG. 1, at heat exchanger 34, the CPO output exchanges heat with the natural gas input to the CPO reactor 22, and thereby provides heated natural gas input to the CPO-input line 24, via line 40. Similarly, the air input that is heated up by the heat exchange with the CPO output at the heat exchanger 36, is directed to the CPO-input line 24, through the input line. Furthermore, the steam input is heated as it is transported to the CPO-input line 24, through input line 44, by the heat exchange with the CPO output at the heat exchanger 38. The CPO output, after passing through the heat exchangers with the CPO inputs, becomes cooler. The cooled CPO output (including syngas) may be further cooled in a condenser 86 (mentioned above), to remove moisture. The gas can then be compressed in the syngas compressor 74, to a higher pressure relative to the CPO output pressure. In one embodiment, the cooled CPO output is compressed to a pressure in a range from about 5 atmospheres to about 60 atmospheres.

In the F-T reactor 62, the syngas reacts in the presence of a catalyst, and yields an F-T reactor product that is directed into the F-T reactor output line 66. In one embodiment, the product is a mixture of gases and liquids. The gases are separated out from the product liquids in a separator 74. The separator 74 may be any kind of gas-liquid separation device. After the separation, the product-liquid is directed through the F-T liquid output line 76, and the product gases are directed into the F-T gas output line 80. Since air, rather than oxygen, is supplied to the CPO system 22 in the oxidation reaction, the product gases from the F-T reactor will include nitrogen among other gaseous products. In one embodiment, the nitrogen content in the F-T reactor product gases is greater than about 20 volume %.

As described earlier, in one embodiment, the gaseous products obtained after the separation from the F-T reactor liquid products are directed as an input to the PE 106, through a PE input line 102. The power engine 106 may be any kind of power production unit that may use the gaseous inputs as a fuel. In one embodiment, the PE 106 is a reciprocating engine, such as a Jenbacher engine. The PE 106 typically produces electrical energy. The electrical energy of the PE 106 may be taken out through the PE output line 104, and supplied for a suitable energy need.

In an embodiment, the CPO reactions are exothermic reactions. However, it is usually desirable that some external heat may be provided to initiate the CPO process. In one embodiment, the heat is provided by heating the initial input gases. The CPO reaction may be initiated by passing the input gases over the catalyst in the CPO reactor 22, for the initial reaction at a temperature less than about 400° C. As used herein, the "initial reaction" is the first reaction producing heated CPO output. In one embodiment, the desired temperature within the CPO reactor 22 is in the range from about 275° C. to about 325° C. Once the reaction begins in the CPO reactor 22 (i.e., after an initial start-up period), the CPO reaction may be carried out in the absence of any external heat input, and this can be a desirable system and process advantage.

For the CPO reaction, the natural gas and air may be supplied at atmospheric pressure, or supplied in a compressed form. The natural gas compressor 46 and air compressor 48 require energy to operate. Similarly, the syngas compressor 72 requires energy to compress the syngas. The syngas may be compressed significantly, e.g., to at least about 5 atmospheres, to increase the F-T reaction pressure. An F-T process conducted at high pressures produces desirable long chain alkanes (e.g., $C_5$-$C_{20}$ and higher carbon number hydrocarbons) as the primary F-T liquid product.

In some embodiments, the integration of PE 106 with the CPO system 20 and the F-T system 60 provides the energy input needed for the compressors and other ancillary equipment, such as instrumentation and control equipment. Therefore, in some embodiments, the system 10 for the conversion of gases to liquids becomes self-sustainable, without any further external energy input, i.e., other than the heat required for the initial CPO reaction.

It should be apparent from the discussion above that another embodiment of the invention is directed to a system that comprises:

a) a catalytic partial oxidation (CPO) system configured to convert natural gas, air, and steam, to syngas, in a CPO reaction;

b) a Fischer-Tropsch (F-T) system in communication with the CPO system, and configured to receive at least a portion of the syngas from the CPO system, and to produce a steam product, and F-T liquids and gases;

wherein the F-T system comprises a compressor for compressing the syngas; and also comprises a conduit (e.g., any type of connection or passageway), configured to direct at least a portion of the steam product to the CPO system for carrying out the CPO reaction; and c) a power engine, in communication with the F-T system and at least partially fueled by the F-T liquids or gases, and configured to supply energy to the syngas compressor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a catalytic partial oxidation (CPO) system comprising a CPO-input line and a CPO-output line, wherein
the CPO-input line is in fluid communication with a CPO-natural gas input line, a CPO-air input line, and a CPO-steam input line;
a Fischer-Tropsch (F-T) system comprising an F-T-reactor input line, an F-T-reactor output line, an F-T water input line, and an F-T steam output line, wherein
the F-T-reactor input line is in fluid communication with the CPO-output line and an F-T-syngas compressor,
the F-T-reactor output line is in fluid communication with an F-T-liquid output line, and an F-T-gas output line, and
the F-T steam output line is in fluid communication with the CPO-steam input line; and
a power engine (PE) system comprising a power engine (PE), a PE-input line, and a PE-output line, wherein
the PE-input line is in fluid communication with the F-T-gas output line, and the PE is configured to provide energy to the F-T-syngas compressor.

2. The system of claim 1, wherein the CPO-air input line is further in communication with a CPO-air compressor, and the CPO-air compressor is in communication with the PE.

3. The system of claim 1, further comprising a steam-heat exchanger in communication with the CPO-output line and the CPO-steam input line.

4. The system of claim 1, further comprising a natural gas-heat exchanger in communication with the CPO-output line and the CPO-natural gas input line.

5. The system of claim 1, further comprising an air-heat exchanger in communication with the CPO-output line and the CPO-air input line.

6. The system of claim 1, further comprising a syngas-condenser in fluid communication with the CPO-output line and the F-T-reactor input line.

7. The system of claim 1, further comprising a F-T gas-liquid separator in fluid communication with the F-T-reactor output line, the F-T-gas output line, and the F-T-liquid output line.

8. A system, comprising:
a) a catalytic partial oxidation (CPO) system configured to convert natural gas, air, and steam, to syngas, in a CPO reaction;
b) a Fischer-Tropsch (F-T) system in communication with the CPO system, and configured to receive at least a portion of the syngas from the CPO system, and to produce a steam product, and F-T liquids and gases;
wherein the F-T system comprises a compressor for compressing the syngas; and also comprises a conduit configured to direct at least a portion of the steam product to the CPO system for carrying out the CPO reaction; and
c) a power engine, in communication with the F-T system and at least partially fueled by the F-T liquids or gases, and configured to supply energy to the syngas compressor.

* * * * *